(No Model.)
C. R. STRAUGHN.
COMBINED FERTILIZER DISTRIBUTER AND SEED DRILL.
No. 256,404. Patented Apr. 11, 1882.
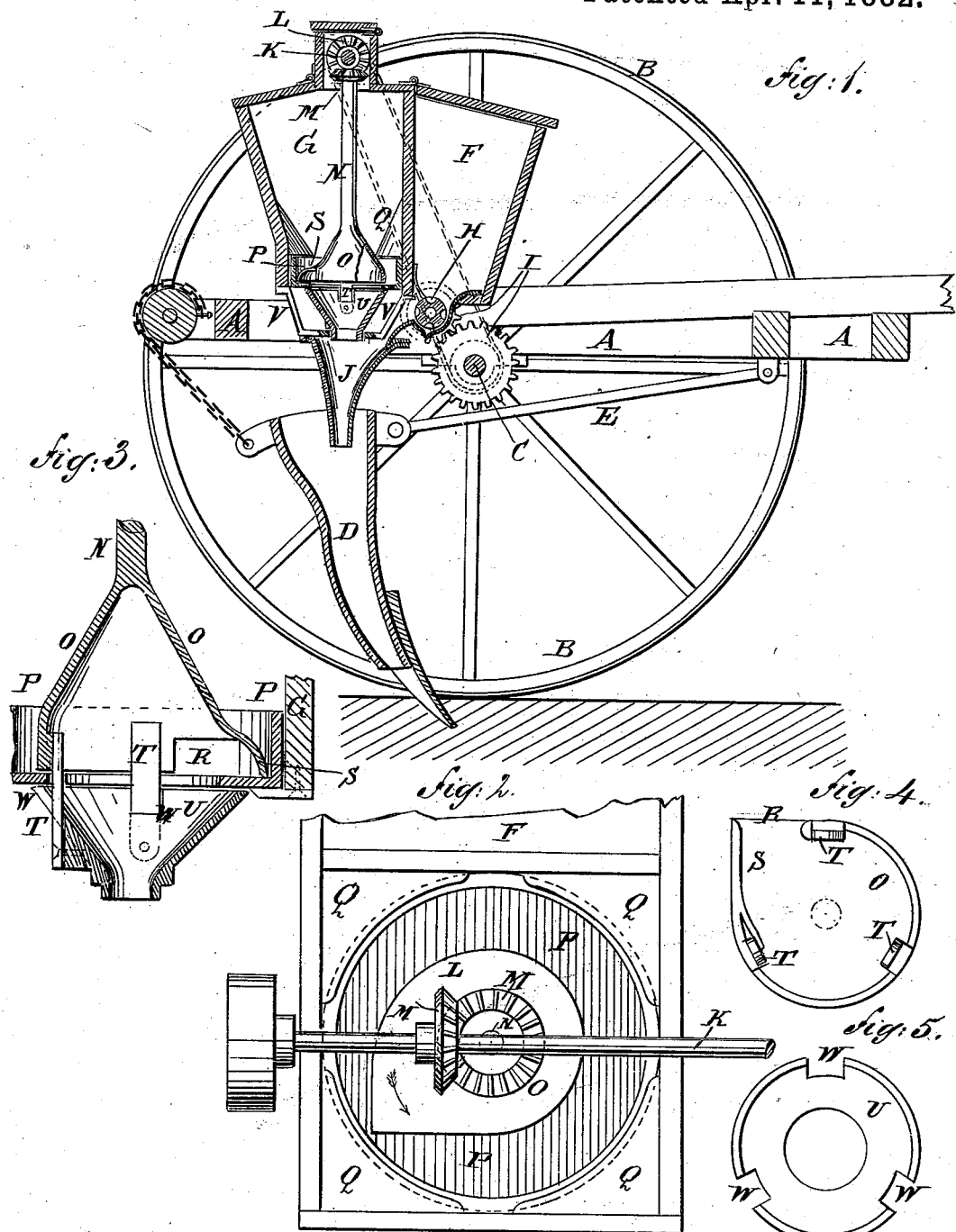
WITNESSES:
Chas. Nida
C. Sedgwick
INVENTOR:
C. R. Straughn
BY Munn & Co
ATTORNEYS.

UNITED STATES PATENT OFFICE.

CHARLES R. STRAUGHN, OF CENTREVILLE, MARYLAND.

COMBINED FERTILIZER-DISTRIBUTER AND SEED-DRILL.

SPECIFICATION forming part of Letters Patent No. 256,404, dated April 11, 1882.

Application filed January 26, 1882. (No model.)

*To all whom it may concern:*

Be it known that I, CHARLES R. STRAUGHN, of Centreville, Queen Anne county, Maryland, have invented a new and useful Improvement in Combined Fertilizer-Distributers and Seed-Drills, of which the following is a full, clear, and exact description.

Reference is to be had to the accompanying drawings, forming part of this specification, in which similar letters of reference indicate corresponding parts in all the figures.

Figure 1 is a sectional side elevation of my improvement. Fig. 2 is a plan view of a part of the same, enlarged. Fig. 3 is a sectional side elevation of a part of the same, enlarged. Fig. 4 is a bottom view of the upper part of the feed mechanism, and Fig. 5 is a plan view of the lower part of the feed mechanism.

The object of this invention is to promote certainty and uniformity in the distribution of phosphates and other fine fertilizers, and also to prevent the fertilizer from clogging.

The invention consists in the fertilizer feed mechanism constructed of a hollow cone having a side opening and a scoop projection, and rotating in a stationary cup or recess having center opening, and an inverted truncated hollow cone connected by bars with the hollow feed-cone to guide the fertilizer into the seed-conducting spout; and also in the combination, with the fertilizer-box and the seed-conducting spout, of a horizontal shaft connected by gear-wheels with an upright shaft having at its lower end a hollow cone provided with a side opening and a scoop projecting and rotating in a cup or recess having center opening and an inverted truncated hollow cone connected with the feed-cone by bars, whereby the fertilizer will be discharged with a positive force, as will be hereinafter fully described.

A represents the frame; B, the wheels; C, the axle; D, the hoe, which serves also as a spout to conduct the fertilizer and seed to the ground; and E is the draw-bar of an ordinary grain-drill.

F is the seed-box, and G is the fertilizer-box, which are separated by a partition or division-wall, and may also be divided into compartments by cross-partitions.

The seed is removed from the seed-box F by a seed-dropping cylinder, H, attached to the axle C, or connected with and driven from the axle C by gear-wheels I. As the seed is discharged from the seed-box F it falls into the tapering spout J, through which it passes into the interior of the hoe D, and is conducted to the ground. The conductor-spout J is secured to or connected with the bottoms of the seed-boxes F G.

In bearings in the upper part or attached to the upper part of the ends of the fertilizer-box G revolves a shaft, K, to which are attached as many beveled-gear wheels L as there are drill-holes attached to the machine. The shaft K is driven from the axle C by pulleys and a band, as indicated in Fig. 1, or by other suitable gearing. The teeth of each gear-wheel L mesh into the teeth of a beveled-gear wheel, M, attached to the upper end of a shaft or stem, N, upon the lower end of which is formed, or to it is attached, the hollow cone O. The lower edge or base of the hollow cone O rests upon or works close to the bottom of a cylindrical cup or recess, P, attached to or formed in the bottom of the fertilizer-box G. The angular spaces at the corners of the fertilizer-box G are filled with inclined blocks Q to guide the fertilizer into the cup or recess P.

In the middle part of the bottom of the cup or recess P is formed a large opening for the passage of the fertilizer. In the lower part of one side of the hollow cone O is formed an opening, R, at the rear side of which the shell of the cone O is provided with a scoop-shaped extension, S. The outer edge of the scoop S projects to, or nearly to, the side of the cup or recess P, so that the scoop S, when the cone O is revolved, will force the fertilizer into the interior of the said cone, push it off the bottom of the cup or recess P, and cause it to fall through the opening in the said bottom.

To the inner surface of the lower part of the cone O are attached the upper ends of three or more bars, T, which pass through the opening in the bottom of the cup or recess P, through openings W in the inverted hollow cone U, and are attached at their lower ends to the said inverted hollow cone U, which is placed beneath the bottom of the cup or recess P, so that the inverted hollow cone U will be carried around by and with the feed-cone O in its revolution. The inverted hollow cone U is truncated to form a discharge-opening, so that the said hollow cone U will receive the fertilizer as it falls from the bottom of the cup or recess P and guide it into the conductor-spout J, so that it will pass to the ground with the seed. The lower part of the inverted hollow cone U revolves in a support or bracket, V, attached to the bottom of the fertilizer-box G. With this construction the feed will be positive, and the surface with which the fertilizer comes in contact being all inclined, the said fertilizer will pass freely to the ground.

Having thus described my invention, I claim as new and desire to secure by Letters Patent—

1. In a combined fertilizer-distributer and seed-drill, the fertilizer-feed constructed substantially as herein shown and described, and consisting of the rotating hollow cone O, having side opening, R, and scoop-projection S, the stationary cup or recess P, having a central opening in its bottom, the connecting-bars T, and the inverted hollow truncated cone U, as set forth.

2. In a combined fertilizer-distributer and seed-drill, the combination, with the fertilizer-box G and the conductor-spout J, of the shaft K, the gear-wheels L M, the shaft N, the hollow cone O, having side opening, R, and scoop-projection S, the cup or recess P, having center opening, the connecting-bars T, and the inverted hollow truncated cone U, substantially as herein shown and described, whereby the fertilizer is discharged with a positive force, as set forth.

CHARLES R. STRAUGHN.

Witnesses:
R. E. FEDDEMAN,
W. E. TEMPLE.